United States Patent
King et al.

(10) Patent No.: US 8,839,150 B2
(45) Date of Patent: Sep. 16, 2014

(54) GRAPHICAL OBJECTS THAT RESPOND TO TOUCH OR MOTION INPUT

(75) Inventors: Nicholas V. King, San Jose, CA (US); Brett Bilbrey, Sunnyvale, CA (US); Todd Benjamin, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 748 days.

(21) Appl. No.: 12/703,655

(22) Filed: Feb. 10, 2010

(65) Prior Publication Data
US 2011/0193788 A1    Aug. 11, 2011

(51) Int. Cl.
*G06F 3/048*   (2013.01)
*G06F 3/0346*   (2013.01)
*G06F 17/30*   (2006.01)
*G06F 3/0488*   (2013.01)
*G06F 3/01*   (2006.01)

(52) U.S. Cl.
CPC .... *G06F 3/0346* (2013.01); *G06F 2203/04808* (2013.01); *G06F 17/30126* (2013.01); *G06F 3/04883* (2013.01); *G06F 3/017* (2013.01)
USPC ............ 715/836; 715/837; 715/852; 715/863

(58) Field of Classification Search
CPC .......................... G06F 3/0481–3/04817; G06F 3/0484–3/04845; G06F 3/0488–3/04886
USPC .......................... 345/1.1–689; 715/200–867; 370/200–916; 455/1–899
See application file for complete search history.

(56) References Cited

U.S. PATENT DOCUMENTS

| | | |
|---|---|---|
| 5,063,600 A | 11/1991 | Norwood |
| 5,429,322 A | 7/1995 | Waymeyer |
| 5,548,705 A | 8/1996 | Moran et al. |
| 5,809,278 A | 9/1998 | Watanabe et al. |
| 6,470,341 B1 * | 10/2002 | Rekimoto .............................. 1/1 |
| 6,545,669 B1 * | 4/2003 | Kinawi et al. ................. 345/173 |
| 6,636,246 B1 * | 10/2003 | Gallo et al. .................... 715/805 |
| 6,681,031 B2 | 1/2004 | Cohen et al. |
| 7,460,123 B1 | 12/2008 | Hull |
| 7,532,196 B2 | 5/2009 | Hinckley |
| 2002/0140625 A1 * | 10/2002 | Kidney et al. ................... 345/1.1 |
| 2004/0117727 A1 * | 6/2004 | Wada ............................. 715/500 |
| 2005/0030255 A1 | 2/2005 | Chiu et al. |
| 2005/0219211 A1 | 10/2005 | Kotzin et al. |
| 2005/0219223 A1 * | 10/2005 | Kotzin et al. ................. 345/173 |
| 2006/0146765 A1 * | 7/2006 | Van De Sluis et al. ........ 370/338 |
| 2006/0256074 A1 | 11/2006 | Krum et al. |
| 2007/0146347 A1 | 6/2007 | Rosenberg |
| 2007/0157089 A1 | 7/2007 | Van Os et al. |
| 2007/0216712 A1 * | 9/2007 | Louch ........................... 345/660 |

(Continued)

*Primary Examiner* — William Bashore
*Assistant Examiner* — Linda Huynh
(74) *Attorney, Agent, or Firm* — Fish & Richardson P.C.

(57) ABSTRACT

A first graphical object on a user interface of a device can be transformed to a second graphical object on the user interface. The second graphical object can be manipulated by a user on the user interface using touch input or by physically moving the device. When manipulated, the object can be animated to appear to have mass that responds to real-world, physical forces, such as gravity, friction or drag. The data represented by the second graphical object can be compressed or archived using a gesture applied to the second graphical object. Graphical objects can be visually sorted on the user interface based on their mass (size). The visual appearance of graphical objects on the user interface can be adjusted to indicate the age of data represented by the graphical objects.

36 Claims, 12 Drawing Sheets

(56) References Cited

U.S. PATENT DOCUMENTS

| | | | |
|---|---|---|---|
| 2008/0246778 A1* | 10/2008 | Ham et al. | 345/646 |
| 2008/0309634 A1 | 12/2008 | Hotelling et al. | |
| 2009/0021475 A1* | 1/2009 | Steinle et al. | 345/156 |
| 2009/0066646 A1 | 3/2009 | Choi et al. | |
| 2009/0201270 A1* | 8/2009 | Pikkujamsa et al. | 345/184 |
| 2009/0303231 A1* | 12/2009 | Robinet et al. | 345/419 |
| 2009/0307623 A1* | 12/2009 | Agarawala et al. | 715/765 |
| 2010/0013761 A1* | 1/2010 | Birnbaum et al. | 345/156 |
| 2010/0037178 A1* | 2/2010 | Queric | 715/836 |
| 2010/0083111 A1* | 4/2010 | de los Reyes | 715/702 |
| 2010/0156812 A1 | 6/2010 | Stallings et al. | |
| 2011/0078571 A1 | 3/2011 | Asbahr et al. | |
| 2011/0163944 A1* | 7/2011 | Bilbrey et al. | 345/156 |
| 2012/0032877 A1* | 2/2012 | Watkins et al. | 345/156 |
| 2012/0188243 A1* | 7/2012 | Fujii et al. | 345/426 |

* cited by examiner

GRAPHICAL OBJECTS THAT RESPOND TO TOUCH OR MOTION INPUT

TECHNICAL FIELD

This subject matter is generally related to user interactions with graphical objects displayed on a user interface of a device.

BACKGROUND

Conventional personal computers include operating systems that often provide a virtual "desktop" metaphor where users can manipulate and organize various graphical objects. This metaphor is easily understood by users because it is intuitive and relates to their real world, physical environment. Modern computing devices, such as smart phones, often provide a large variety of applications. Some of these applications, however, provide interfaces that lack an equivalent of the "desktop" metaphor and as a result are more difficult to comprehend by the average user.

SUMMARY

A first graphical object on a user interface of a device can be transformed to a second graphical object on the user interface. The second graphical object can be manipulated by a user on the user interface using touch input or by physically moving the device. When manipulated, the object can be animated to appear to have mass that responds to real-world, physical forces, such as gravity, friction or drag. The data represented by the second graphical object can be compressed or archived using a gesture applied to the second graphical object. Graphical objects can be visually sorted on the user interface based on their mass (size). The visual appearance of graphical objects on the user interface can be adjusted to indicate the age of data represented by the graphical objects.

In some implementations, a first graphical object is presented on a user interface of a first device. Touch input is received through the user interface. In response to the touch input, the first graphical object is transformed into a second graphical object. Motion input is received from one or more motion sensors onboard the first device. In response to the motion input, the second graphical object is animated in the user interface so that it appears to respond to the motion input.

In some implementations, a first graphical object is presented on a user interface of a device. A first touch input is received through the user interface. In response to the first touch input, the first graphical object is transformed into a second graphical object. A second touch input is received when a user touches the second graphical object in the user interface. In response to the second touch input, the second graphical object is animated in the user interface so that it appears to become smaller on the user interface, and data associated with the second graphical object is compressed or archived.

In some implementations, a user interface is presented on a display of a device. Graphical objects representing data are displayed on the user interface. A request is received to sort the graphical objects based on the relative sizes of the data the graphical objects represent. In response to the request, the graphical objects are arranged in a hierarchy on the user interface according to the relative sizes of the data. The arranging includes animating the graphical objects in the user interface so that each object appears to have a mass that responds to real world, physical forces.

In some implementations, a user interface is presented on a display of a device. An object is displayed on the user interface. The object represents data having an age. The visual appearance of the object on the user interface is adjusted based on the age of the data.

DESCRIPTION OF DRAWINGS

Like reference numbers and designations in the various drawings indicate like elements.

DETAILED DESCRIPTION

Device Overview

Figure 1A:
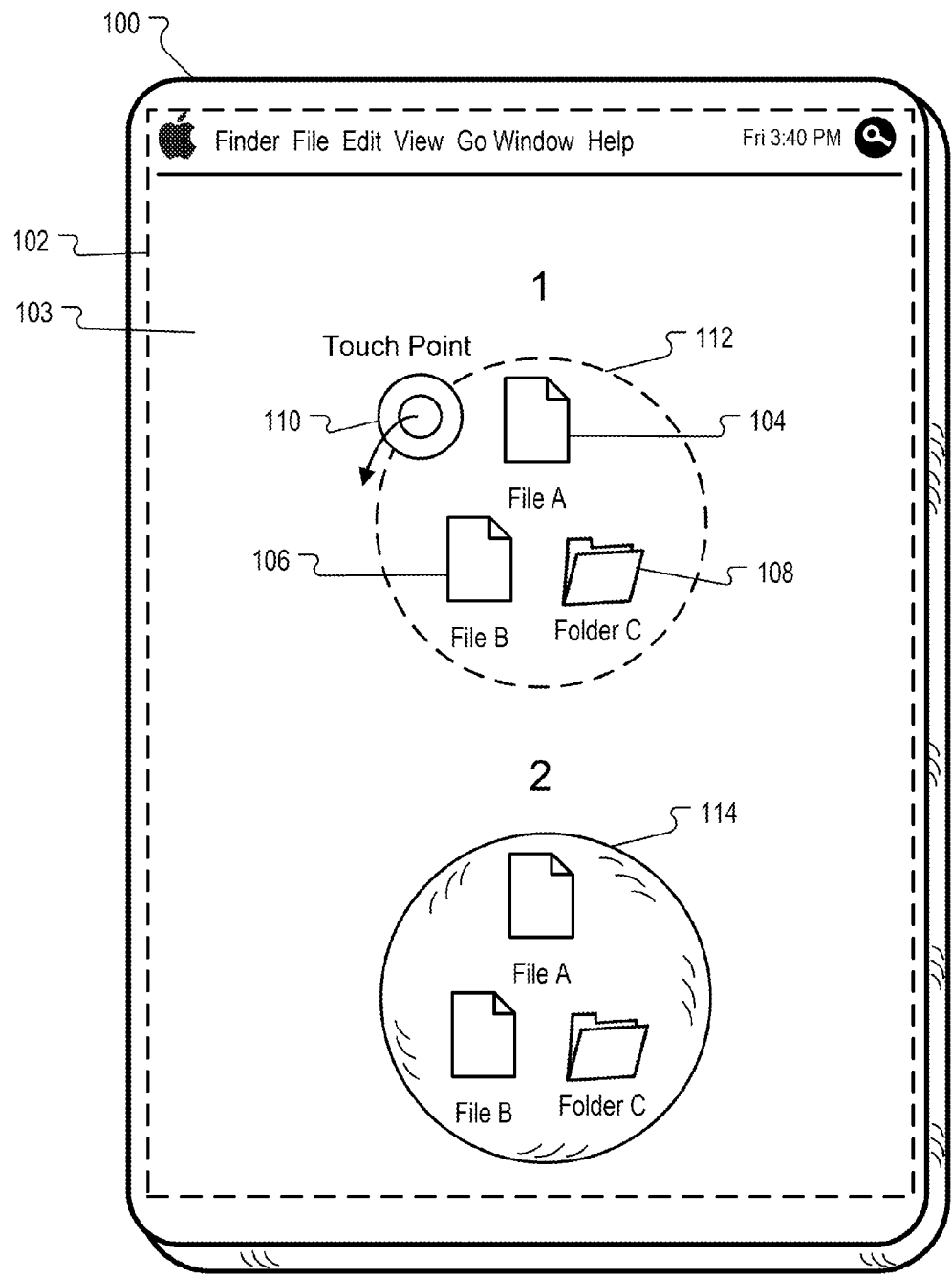
FIG. 1A illustrates an example device displaying an example user interface where a first graphical object is transformed into a second graphical object that responds to touch or motion input.

FIG. 1A illustrates an example device displaying an example user interface where a first graphical object is transformed into a second graphical object that responds to touch or motion input. Device 100 can be, for example, a computer, a tablet computer, a handheld computer, a personal digital assistant, a cellular telephone, a network appliance, a camera, a smart phone, an enhanced general packet radio service (EGPRS) mobile phone, a network base station, a media player, a navigation device, an email device, a game console, a laptop computer, or a combination of any two or more of these data processing devices or other data processing devices.

In some implementations, device 100 includes touch-sensitive display 102. Touch-sensitive display 102 can implement liquid crystal display (LCD) technology, light emitting polymer display (LPD) technology, or some other display technology. Touch sensitive display 102 can be sensitive to haptic and/or tactile contact with a user. In some implementations, touch-sensitive display 102 is also sensitive to touch inputs received in proximity to, but not actually touching, display 102. In addition, device 100 can include a touch-sensitive surface (e.g., a trackpad or touchpad).

In some implementations, touch-sensitive display 102 can include a multi-touch-sensitive display. A multi-touch-sensitive display can, for example, process multiple simultaneous points of input, including processing data related to the pressure, degree, and/or position of each point of input. Such processing facilitates gestures and interactions with multiple fingers, chording, and other interactions. Other touch-sensitive display technologies can also be used, e.g., a display in which contact is made using a stylus or other input tool.

A user can interact with device 100 using various touch inputs, e.g., when a user touches touch sensitive display 102. Gesture inputs can also be derived from multiple touch inputs, e.g., where a user moves his or her finger (or other input tool) across touch sensitive display 102. An example gesture input is a swipe input, where a user swipes his or her finger (or other input tool) across touch-sensitive display 102. In some implementations, device 100 can detect inputs that are received in direct contact with display 102, or that are received within a particular vertical distance of display 102 (e.g., within one or two inches of display 102). Users can simultaneously provide input at multiple locations on display 102. For example, inputs simultaneously touching at two or more locations can be received.

In some implementations, device 100 can implement various device functionalities. As part of one or more of these functionalities, device 100 presents graphical user interfaces on touch-sensitive display 102 of device 100, and also responds to touch input received from a user, for example, through touch-sensitive display 102.

Example Conversion of UI Elements into Graphical Objects

In some implementations, graphical user interface 103 presented on display 102 can include one or more two-dimensional graphical objects. In the example shown, graphical objects are file icons 104, 106, representing files "A" and "B" and folder icon 108 representing folder "C." A user can interact with icons 104, 106, 108 using various inputs. For example, touching file icon 104 can result in file "A" being opened in user interface 103. Similarly, touching folder icon 108 can result in folder "C" opening in user interface 103 to expose the folder contents (e.g., one or more folders). Graphical objects can represent any type of data or content, including but not limited to files, folders, digital photos or videos, audio files, ebooks, etc.

In step 1 (at a first instant of time), a user can use a finger to draw a circle 110 around icons 104, 106, 108 to indicate that the icons are to be grouped together. For example, a user can touch display 102 at touch point 110 and draw circle 112 around icons 104, 106, 108 without removing their finger from display 102. In some implementations, a dashed line or other visual indicator can be displayed to show circle 112 to visually indicate to the user that icons 104, 106, 108 are selected for inclusion into a group.

In step 2 (at a second instant of time), when the user removes their finger from display 102, circle 112 is automatically transformed into three-dimensional graphical object 114, which contains icons 104, 106 and 108. In the example shown, graphical object 114 is a ball or sphere that is detached or "floating" on user interface 103. Note that circle 112 (step 1) and graphical object 114 (step 2) are shown in FIG. 1A as being in two different locations on user interface 103. This was for illustrative purposes only. In practice, circle 12 can be transformed into graphical object 114 at the same location on user interface 103. In some implementations, user interface 103 also can be automatically transformed into a three-dimensional user interface environment.

In this example, multiple icons are associated or grouped together into graphical object 114. In other implementations, however, one or more user interface elements can be transformed into graphical objects.

In some implementations, device 100 includes onboard motion sensors (e.g., accelerometer, gyros), which can detect motion of device 100. Graphical object 114 can move freely about display 102 in response to motion detected by onboard sensors. Graphical object 114 can be animated so as to make graphical object 114 appear to have mass, which can appear to respond to virtual physical forces in user interface 103, such as gravity, friction or drag. Graphical object 114 can bounce or reflect off boundaries of user interface 103 or other graphical objects. Although graphical object 114 is shown as a sphere or ball in this example, other graphical objects can be used, such as a cylinder, wheel, block or any other geometric shape.

In some implementations, the size of graphical object 114 is based on the size of data represented by graphical object 114. For example, if graphical object 114 is a ball, then the radius of the sphere or ball will determine its size (mass). When graphical object 114 is manipulated on user interface 103, the behavior of graphical object 114 in response to touch or motion input can be based on its mass. Larger files (more mass) can be animated to move more slowly than smaller files (less mass) in accordance with Newtonian physics, i.e., acceleration=force/mass.

In some implementations, user interface 103 can have a physical characteristic that can interact with the "mass" of graphical object 114. For example, user interface 103 can have a coefficient of friction or viscosity that can be set by the user. More friction would result in slowing graphical object 114 as it moves about user interface 103.

Example Data Transfer Using Graphical Objects

Figure 1B:
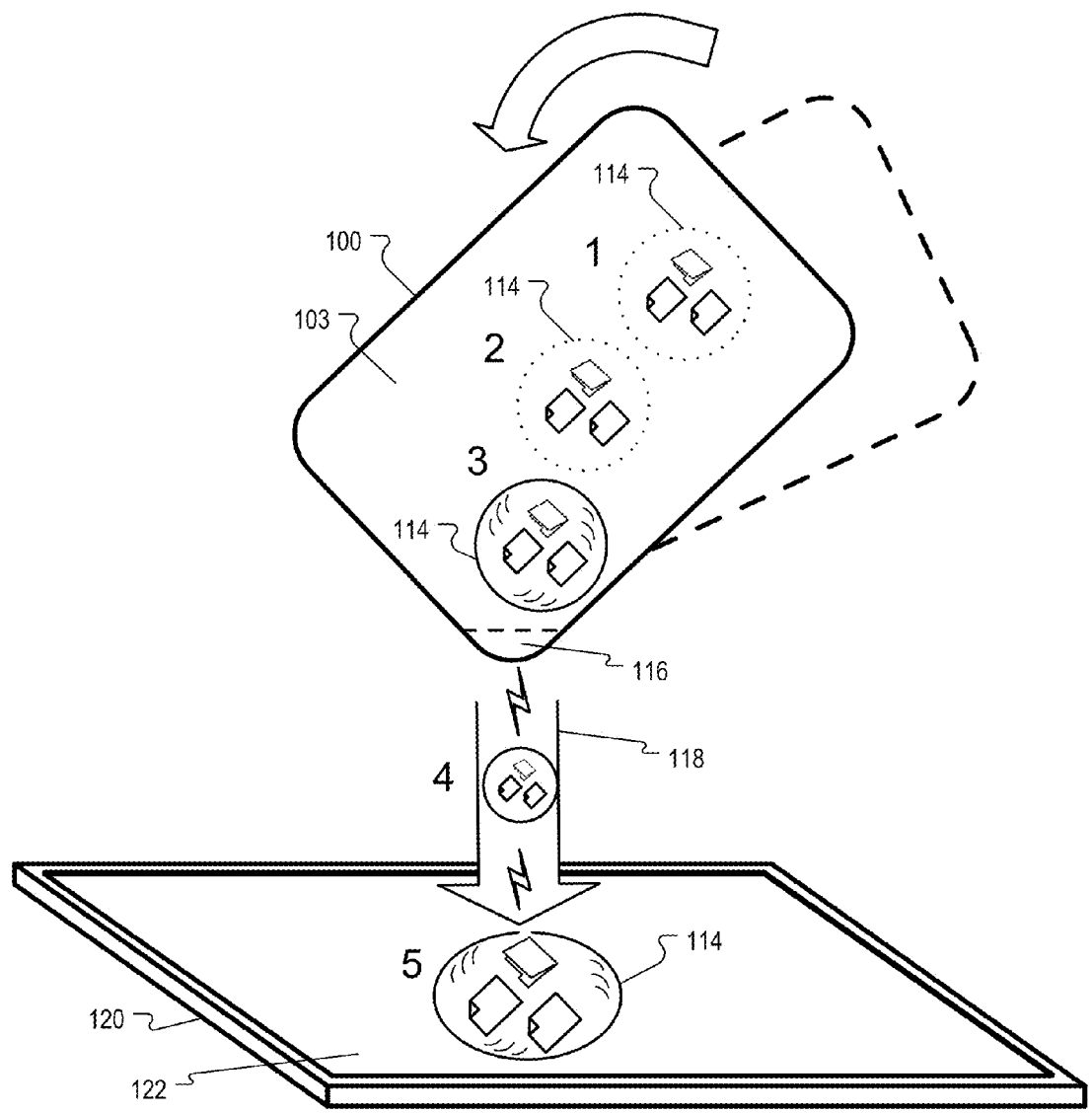
FIG. 1B illustrates the device of FIG. 1A transferring the graphical objects to a second device, proximate to the first device.

FIG. 1B illustrates device 100 of FIG. 1A transferring graphical object 114 to a second device 120, proximate to the first device 100. In some implementations, if device 100 is held proximate to another device 120, and the devices 100, 120 have established wireless communication link 118 with each other, then graphical object 114 (e.g., containing files represented by icons 104, 106, 108) can be manipulated towards virtual opening 116 in user interface 103. For example, referring to steps 1-5 shown in FIG. 1B, a user can make a "pouring" gesture by tilting device 100 over device 120 causing graphical object 114 (e.g., a ball) to roll down user interface 103 (steps 1-3) and through virtual opening 116. The speed of graphical object 114 can be based on a viscosity, friction or drag characteristic of user interface 103.

When graphical object 114 enters virtual opening 116, a data transfer can be triggered where the files "A" and "B and folder "C" represented by file icons 104, 106 and folder icon 108, respectively, are transferred to device 120 over wireless communication link 118 (step 4). An example communication link can be a Radio Frequency (RF) link using known communication protocols (e.g., Bluetooth, WiFi, RFID). Device 120 can display graphical object 114 on display 122 (step 5). In some implementations, a user of device 120 can manipulate graphical object 114 on user interface 122 in the same manner as graphical object 114 can be manipulated on user interface 103 of device 100. On device 100 or 120, a second touch input on graphical object 114 or other input can be used to disassociate icons 104, 106, 108 from graphical object 114 so that the icons can be used to open the corresponding files or folder.

Example Compression and Archiving

Figure 2:
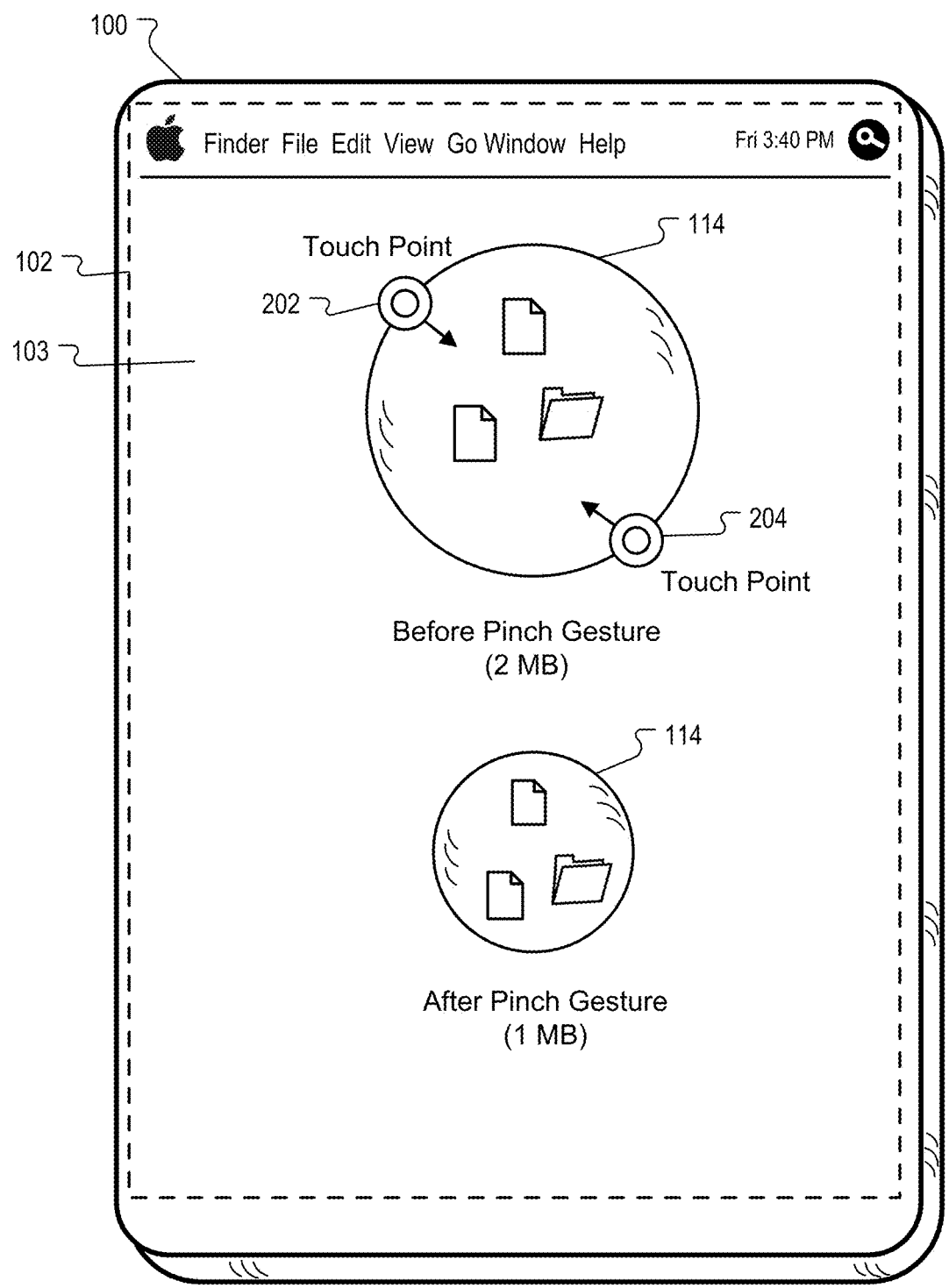
FIG. 2 illustrates compressing or archiving the graphical objects of FIGS. 1 and 2 using a gesture.

FIG. 2 illustrates an example process for compressing or archiving the graphical object 114 of FIGS. 1A-1B using a gesture. In some implementation, it may be desirable to compress the files in graphical object 114 before graphical object 114 is transferred to device 120. In the example shown, compression or archiving of data associated with graphical object 114 can be accomplished by touching graphical object 114 at two opposing touch points 202, 204, and making a pinching gesture on display 102. In response to the gesture, graphical object 114 can become smaller (smaller radius) to visually indicate to the user that the data represented by graphical object 114 have been compressed or archived. The resulting size of graphical object 114 can be reduced in accordance with the pinching distance. In some implementations, text, badge or other indicator can be displayed on or proximate to graphical object 114 showing the new size or any other desired information (e.g., graphical object 114 can change color or shape to indicate compression or archive).

Example Sorting of Graphical Objects

Figure 3A:
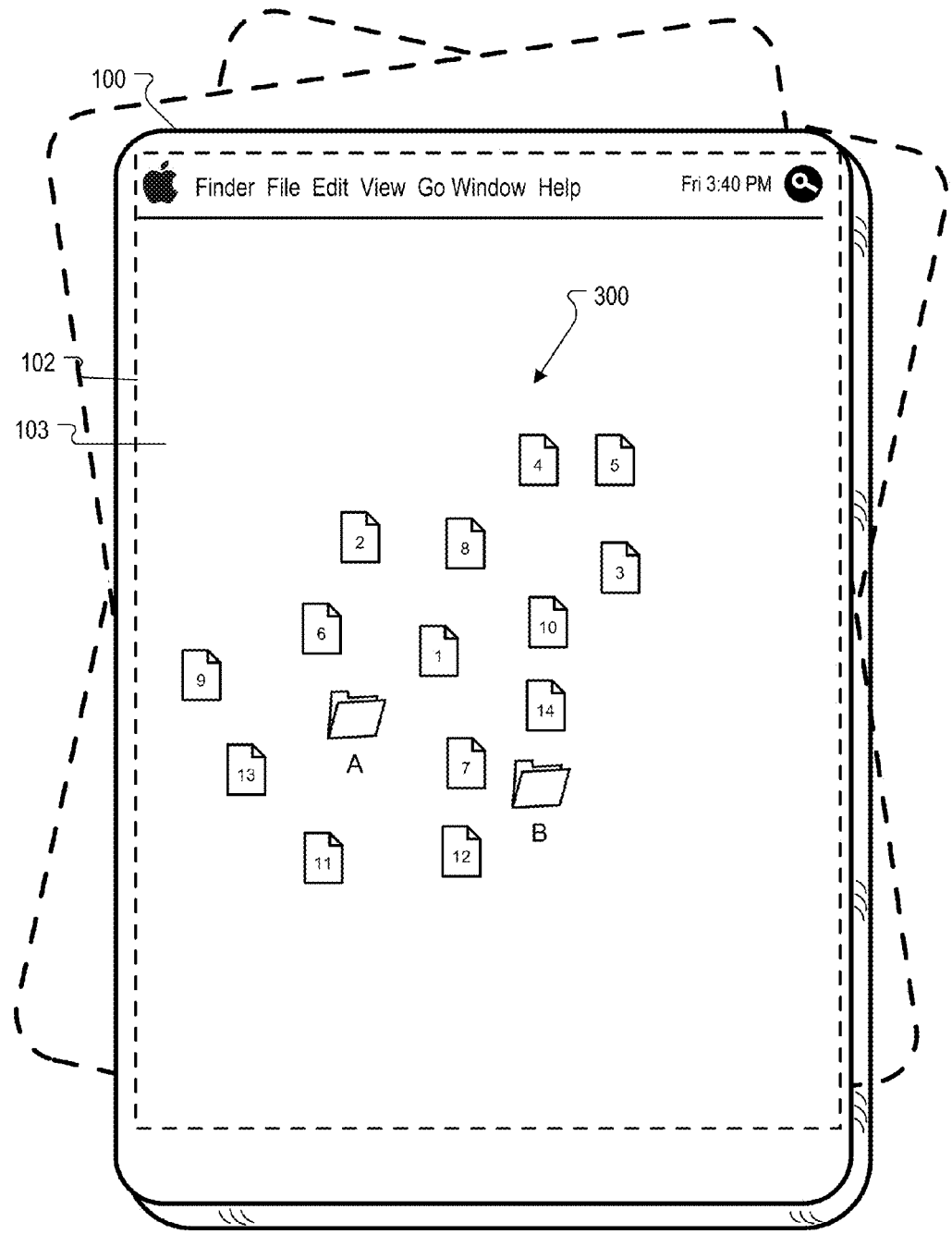
FIGS. 3A-3B illustrates sorting graphical objects based on size.
Figure 3B:
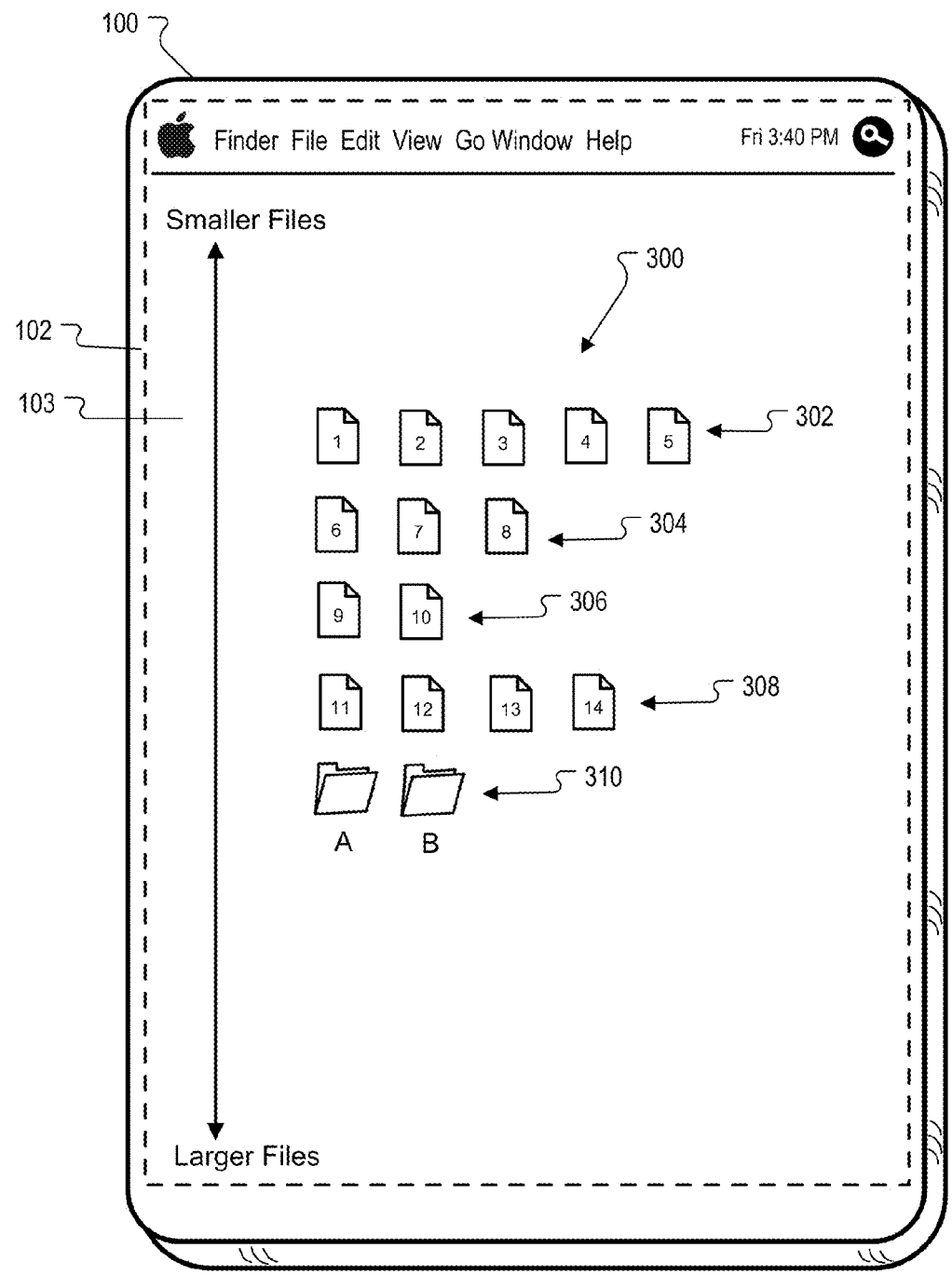

FIGS. 3A-3B illustrate an example process for sorting graphical objects 300 based on size (mass). In the example show, graphical objects 300 (e.g., file and folder icons) can be sorted in user interface 103 based on their size (mass). Device 100 can be placed in a state so that graphical objects 300 are detached from user interface 103 and "float" on user interface 103 as if under the influence of real world, physical forces, such as gravity, friction and drag. A sort function can be invoked by a user. Invocation of a sort function can be a touch or motion gesture, or any other desired input. For example, as shown in FIG. 3A, a user can shake device 100 to start a sort function. In response, graphical objects 300 can bounce around user interface 103 providing a "snow globe" effect. The motion of each graphical object 300 can settle to a stationary state on user interface 103 based on the size of the data represented by graphical object 300, as shown in FIG. 3B.

Referring to FIG. 3B, the final resting location of a given graphical object 300 can provide a visual indication of the size of the data represented by the graphical object. In the example shown, file icons 1-5, representing data of similar size (mass), settled at level 302 in user interface 103, file icons 6-8, representing data of similar size, settled at level 304 in user interface 103, file icons 9 and 10, representing data of similar size, settled at level 306 in user interface 103, file icons 11-14, representing data of similar size, settled at level 308 in user interface 103, and folder icons A, B, representing data of similar size, settled at level 310 in user interface 103. Since file icons 1-5 settled at level 302 (top level), the corresponding files were the smallest. Likewise, since folder icons A, B settled at level 310 (bottom level), the corresponding folders were the heaviest. Thus, icons (e.g., desktop icons) can be visually sorted by size, where larger files "fall" to the bottom of user interface 103 and the smaller files "rise" to the top of user interface 103. Animation can be applied to graphical objects 300 to simulate the falling and rising actions in user interface 103 under the force of gravity, for example.

The line with arrows indicating file size shown in FIG. 3 is for illustrative purposes only and may not be displayed in user interface 103.

Example Process for Visually Indicating Aging Data

Figure 4:
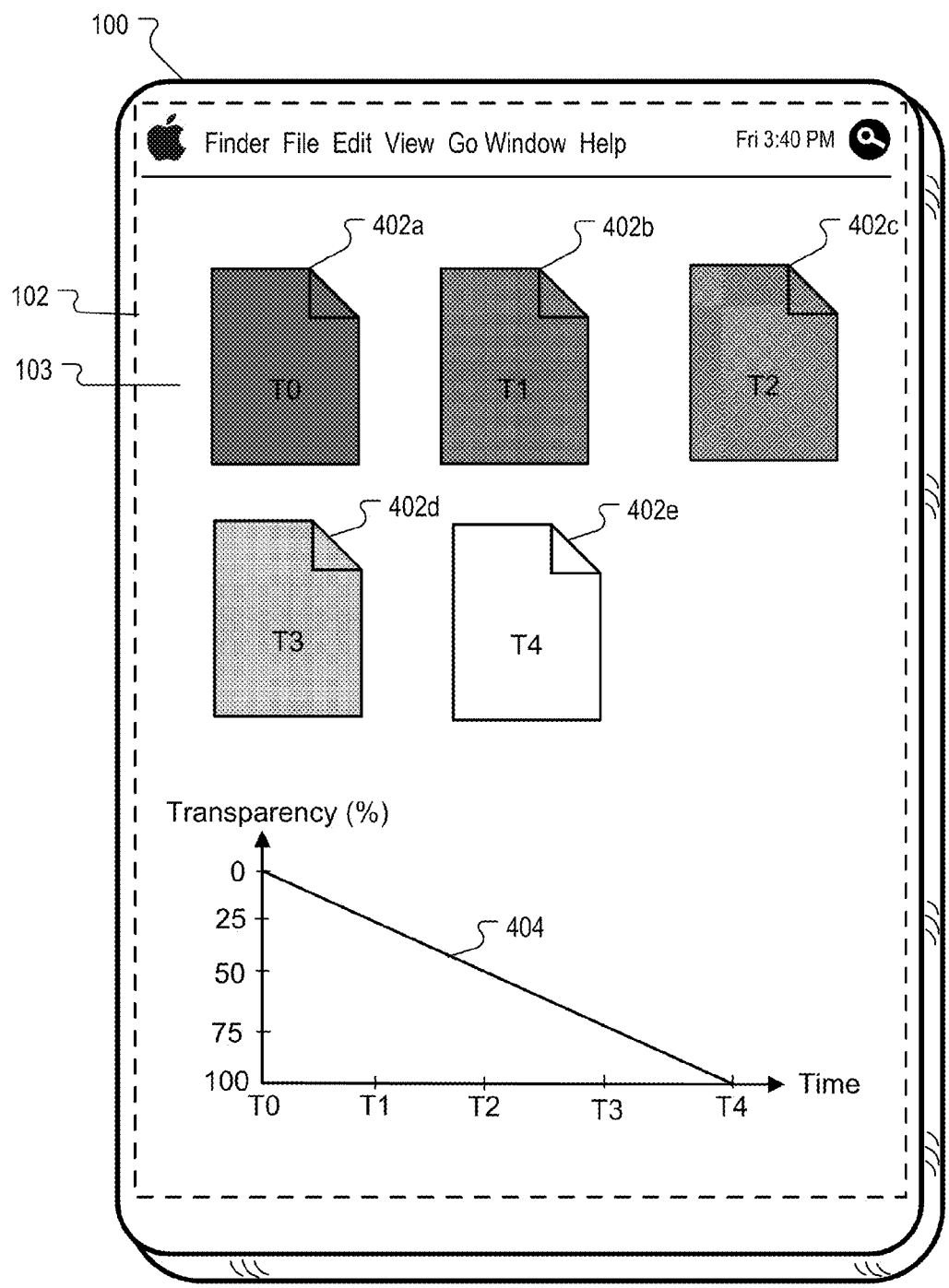
FIG. 4 illustrates visually indicating the age of graphical objects.

FIG. 4 illustrates an example process of visually indicating the age of data represented by graphical objects. In the real world material objects age over time. For example, a material object may loose its color, shine or elasticity, start to rust, etc. In some implementations, graphical objects 402 representing data can be adjusted visually to indicate to a user the age of the data using this "aging metaphor."

In the example shown, five states of a folder icon 402 representing aging data is displayed on user interface 103. At a first time T0, icon 402a is displayed in user interface 103 with 0% transparency. At a second time T1 (where T1>T0), icon 402b is displayed with 25% transparency. At a third time T2 (where T2>T1), icon 402c is displayed with 50% transparency. At a fourth time T3 (where T3>T2), icon 402d is displayed with 75% transparency. And finally at a fifth time T4 (where T4>T3), icon 402e is displayed with 100% transparency. In this example, the transparency of icon 402 was reduced linearly over five time points, as illustrated by curve 404. Accordingly, a user can use simple visual inspection of file icons on user interface 103 to determine the relative age of the files represented by the icons. Curve 404 is shown in FIG. 4 for illustrative purposes and may not be displayed in practice.

In some implementations, other visual indicators can be used to indicate age of data other than transparency. For example, icons representing data or files can change color based on age. Age of data can be indicated by adjusting color brightness, hue and saturation of icons representing the data. Icons representing aging data can be animated to appear more active for newer data or files (e.g., a fast jiggling icon) than with older data or files (e.g., a slow jiggling icon).

In some implementations, icons representing data can be modified over time to look "hot" or "cold." For example, recently created, edited or reviewed data or files can be represented by icons that include an animated flame and/or be colored with varying shades of red to indicate that the corresponding data or files were recently created, edited or reviewed. And icons representing older files can be animated to appear "cold," such as drawing frost on the icon and/or coloring the icon with varying shades of blue to indicate that the corresponding data or files were created, edited or reviewed in the past.

Example Processes

Figure 5:
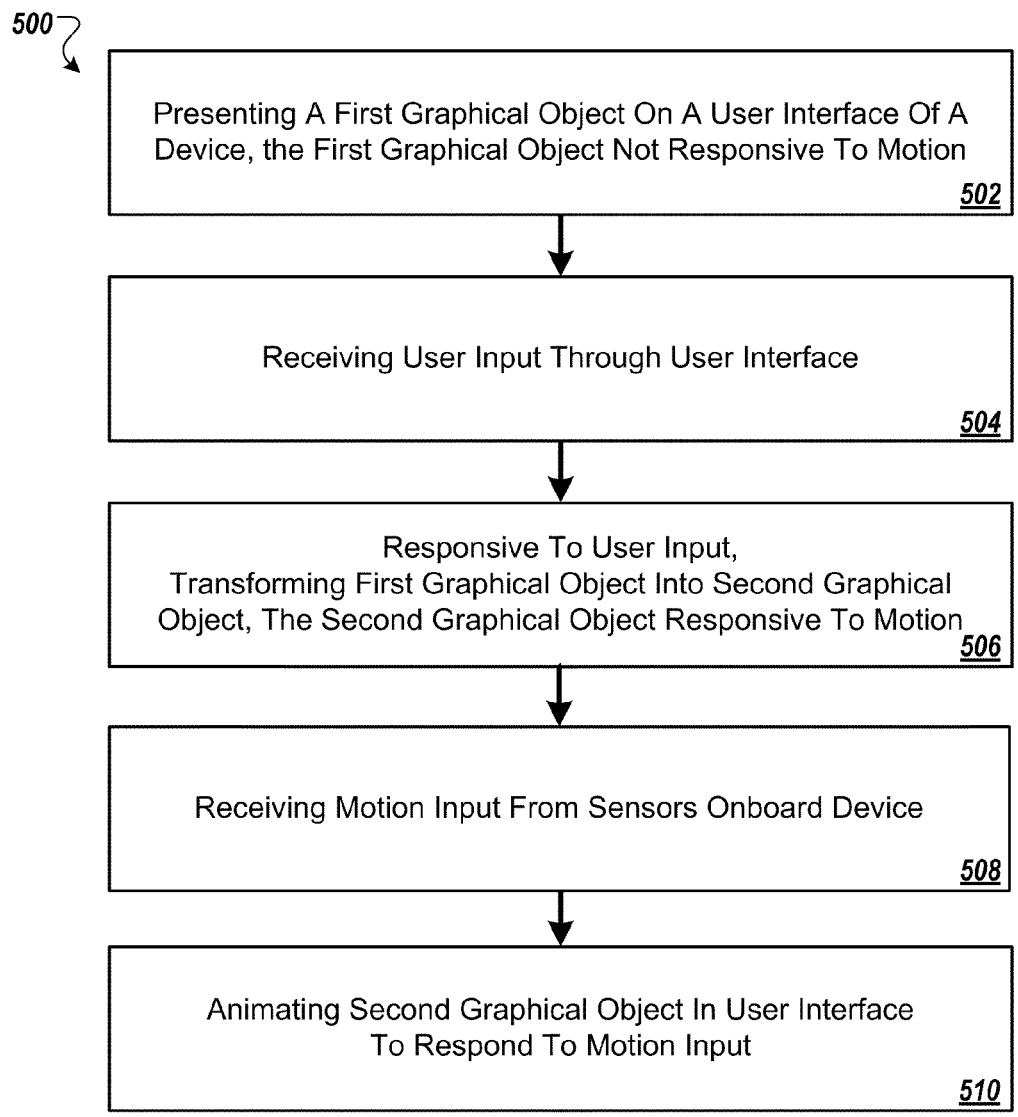
FIG. 5 is a flow diagram of an example process for transforming a first graphical object into a second graphical object that behaves as if under the influence of real world, physical forces.

FIG. 5 is a flow diagram of an example process 500 for transforming a first graphical object into a second graphical object that behaves as if under the influence of real world, physical forces. Process 500 will be described in reference to a system for implementing process 500.

In some implementations, a system can present a first graphical object on a user interface (502). The first graphical object can be, for example, an icon representing a file, folder, directory or other data. An input can be received through the user interface (504). In some implementations, the first graphical object does not respond to physical motion of the device. For example, the user interface can be presented on a touch sensitive display of a device. The touch input can be a single touch with a finger or stylus, a multi-touch input with two or more fingers or a gesture. The gesture can be a touch gesture or a physical gesture made by physically moving the device. Responsive to the input, the first graphical object is transformed to a second graphical object that responds to motion input (506). For example, the user can touch a two-dimensional file icon, resulting in the file icon transforming into a three-dimensional ball. Motion input can be received from one or more onboard sensors of the device (508). For example, an accelerometer or gyro onboard the device can sense accelerations or angular motion, which can be received by process 500. The second graphical object can be animated in the user interface to appear to respond to the motion (510). For example, if the second graphical object is a ball, the user can move the device to make the ball roll on the user interface. The speed of the roll can be based on physical characteristics of the user interface or display environment, such as friction, drag, gravity, viscosity, etc.

Figure 6:
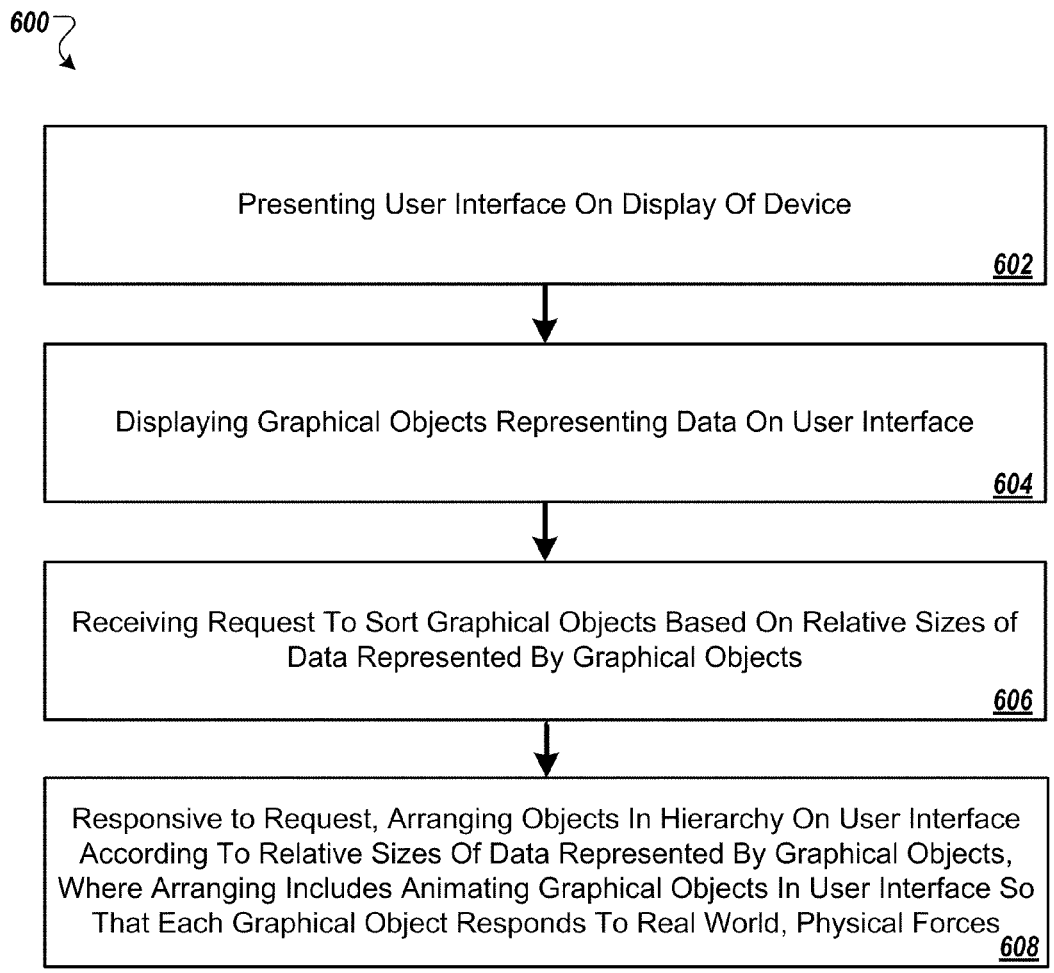
FIG. 6 is a flow diagram of an example process for compressing or archiving data by applying a gesture to a graphical object representing the data.

FIG. 6 is a flow diagram of an example process 600 for compressing or archiving data by applying a gesture to a graphical object representing the data. Process 600 will be described in reference to a system for implementing process 600.

In some implementations, a system presents a user interface on a display of a device (602). Graphical objects representing data can be displayed on the user interface (604). The graphical objects can be, for example, icons representing data, files or folders. A request is received to sort the graphical objects based on the relative sizes of data represented by the graphical objects (606). The request can be a touch gesture or motion gesture. In one example, the user can shake the device causing the graphical objects to move about the user interface, resulting in a "snow globe" effect.

In response to the request, the graphical objects can be automatically arranged in a hierarchy on the user interface according to the relative sizes of data represented by the graphical objects, where the arranging includes animating the graphical objects in the user interface so that each graphical object appears to respond to real world, physical forces (608). For example, larger files have more mass than smaller files. The animation creates the appearance that the larger files (heavier mass) are sinking to the bottom of the user interface and the smaller files (lighter mass) are rising to the top of the user interface.

Figure 7:
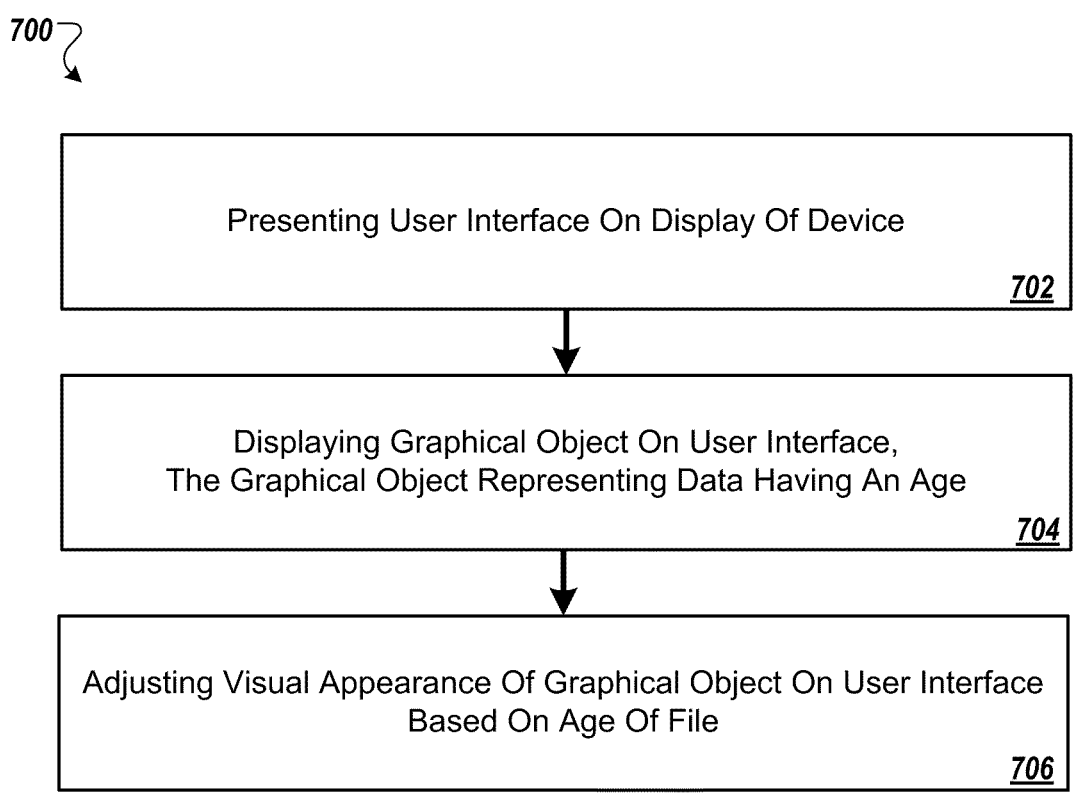
FIG. 7 is a flow diagram of an example process for visually indicating the age of graphical objects.

FIG. 7 is a flow diagram of an example process 700 for visually indicating the age of data represented by graphical objects. Process 700 will be described in reference to a system for implementing process 700.

In some implementations, a system presents a user interface on a display of a device (702). A graphical object is displayed on the user interface (704). The visual appearance of the graphical object on the user interface is adjusted based on the age of the data represented by the graphical object (706). In some implementations, the transparency of the graphical object can be adjusted based on age. For example, a file that is recently created, edited or reviewed can be represented by an icon with zero or low transparency, and a file that was created, edited or reviewed in the past can be represented by an icon with a percentage of transparency to visually indicate its age. Other visible indications of aging data can be employed, for example, changing the color of icons representing data or files, adjusting the brightness, hue or saturation of colors to indicate age, etc. In some implementations, icons can be animated to appear more active for newer data or files (e.g., fast jiggling icon) than with older data or files (e.g., slow jiggling icon).

In some implementations, icons can be modified over time to look "hot" or "cold." For example, recently created, edited or reviewed files can include an animated flame and/or be colored with varying shades of red to indicate how "hot" or recent the data or files were created, edited or reviewed. And older files can be animated to appear "cold" such as drawing frost on the icon and/or coloring the icon with varying shades of blue to indicate how "cold" or how long ago the data or files were created, edited or reviewed.

Example Software Architecture

Figure 8:
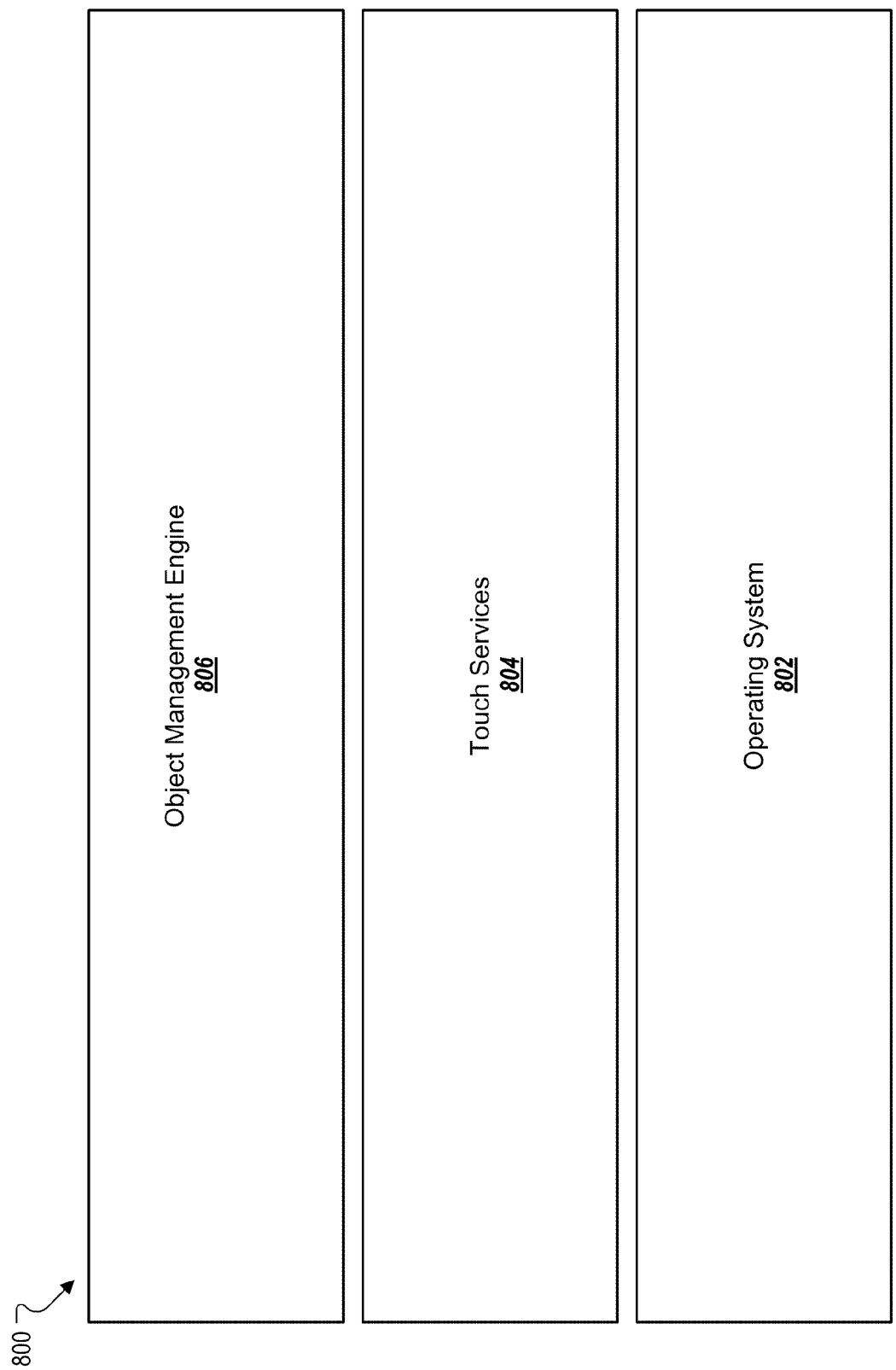
FIG. 8 is a block diagram of an example software architecture of a device for implementing the features described in reference to FIGS. 1-7.

FIG. 8 illustrates example software architecture 800 for implementing the object interactions described in reference to FIGS. 1-7. In some implementations, software architecture 800 can include operating system 802, touch services module 804, and object management engine 806. Architecture 800 can conceptually operate on top of a hardware layer (not shown).

Operating system 802 can provide an interface to the hardware layer (e.g., a capacitive touch display or device). Operating system 802 can include one or more software drivers that communicate with the hardware. For example, the drivers can receive and process touch input signals generated by a touch sensitive display or device in the hardware layer. Operating system 802 can process raw input data received from the driver(s). This processed input data can then made available to touch services layer 804 through one or more application programming interfaces (APIs). These APIs can be a set of APIs that are included with operating systems (e.g., Linux or UNIX APIs), as well as APIs specific for sending and receiving data relevant to touch input.

Touch services module 804 can receive touch inputs from operating system layer 802 and convert one or more of these touch inputs into touch input events according to an internal touch event model. Touch services module 804 can use different touch models for different applications, for example, depending on a state of the device.

The touch input events can be in a format that is easier to use in an application than raw touch input signals generated by the touch sensitive device. For example, a touch input event can include a set of coordinates for each location at which a touch is currently occurring on a user interface. Each touch input event can include information on one or more touches occurring simultaneously.

In some implementations, gesture touch input events can also be detected by combining two or more touch input events. The gesture touch input events can contain scale or rotation information. The rotation information can include a rotation value that is a relative delta in degrees. The scale information can also include a scaling value that is a relative delta in pixels on the display device. Other gesture events are possible.

All or some of these touch input events can be made available to developers through a touch input event API. The touch input API can be made available to developers as a Software Development Kit (SDK) or as part of an application (e.g., as part of a browser tool kit).

Object management engine 806 receives touch inputs from the touch services module 804 and processes the input events, for example, as described above with reference to FIGS. 1-7.

Example Device Architecture

Figure 9:
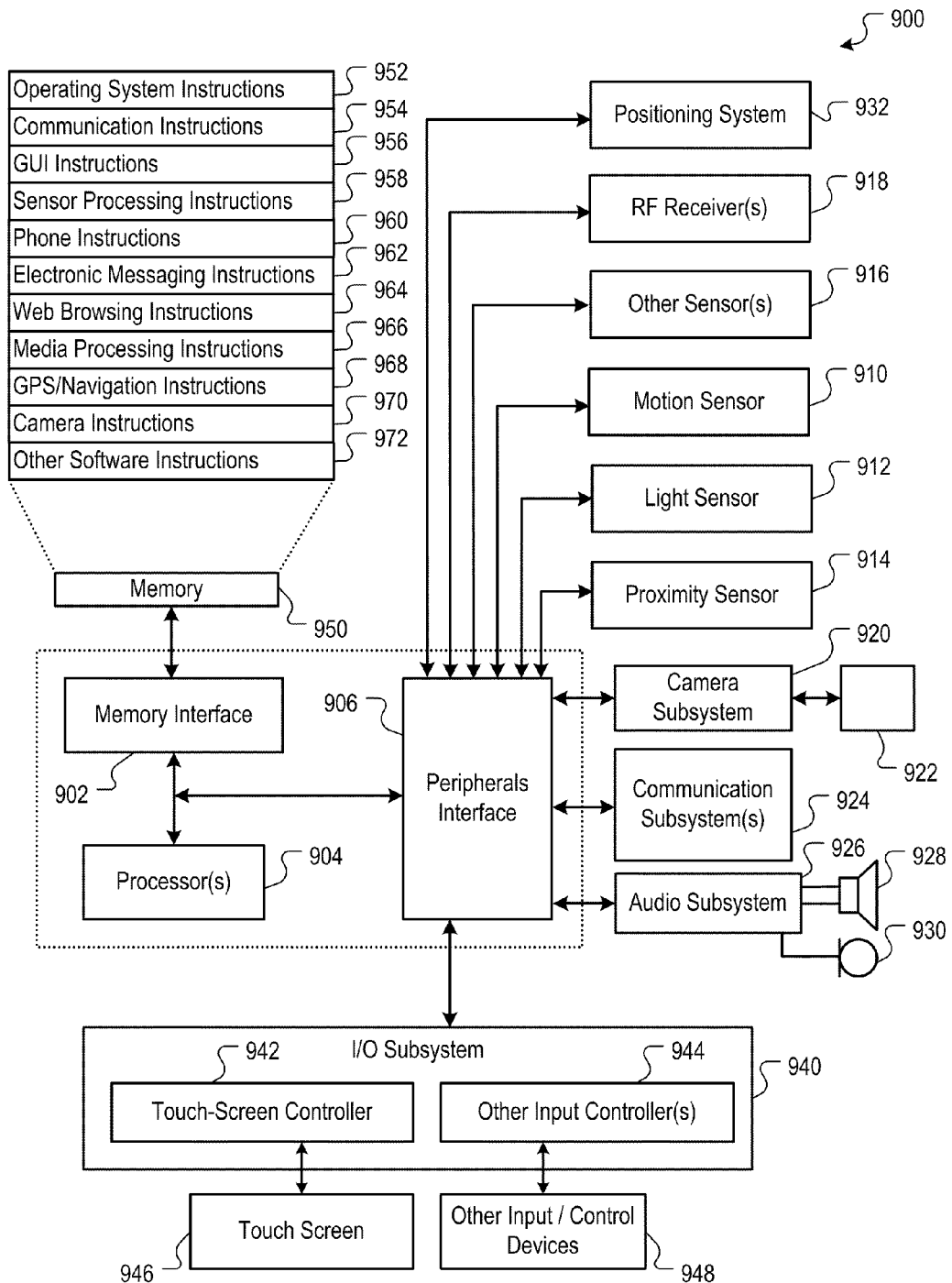
FIG. 9 is a block diagram of an example hardware architecture of a device for implementing the features described in reference to FIGS. 1-7.

FIG. 9 is a block diagram of example hardware architecture of device 900 for processing touch inputs interacting with graphical objects (e.g., object 114). Device 900 can include memory interface 902, one or more data processors, image processors and/or central processing units 904, and peripherals interface 906. Memory interface 902, one or more processors 904 and/or peripherals interface 906 can be separate components or can be integrated in one or more integrated circuits. The various components in device 900 can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate various orientation, lighting, and proximity functions. For example, in some implementations, light sensor 912 can be utilized to facilitate adjusting the brightness of touch screen 946. In some implementations, motion sensor 911 (e.g., an accelerometer, velocimeter, or gyroscope) can be utilized to detect movement of the device. Accordingly, graphical objects and/or media can be presented according to a detected orientation, e.g., portrait or landscape.

Other sensors 916 can also be connected to peripherals interface 906, such as a temperature sensor, a biometric sensor, or other sensing device, to facilitate related functionalities.

Location determination functionality can be facilitated through positioning system 932. Positioning system 932, in various implementations, can be a component internal to device 900, or can be an external component coupled to device 900 (e.g., using a wired connection or a wireless connection). In some implementations, positioning system 932 can include a GPS receiver and a positioning engine operable to derive positioning information from received GPS satellite signals. In other implementations, positioning system 932 can include a magnetometer (e.g., a magnetic compass) and an accelerometer, as well as a positioning engine operable to derive positioning information based on dead reckoning techniques. In still further implementations, positioning system 932 can use wireless signals (e.g., cellular signals, IEEE 802.11 signals) to determine location information associated with the device Hybrid positioning systems using a combination of satellite and television signals, such as those provided by ROSUM CORPORATION of Mountain View, Calif., can also be used. Other positioning systems are possible.

Broadcast reception functions can be facilitated through one or more radio frequency (RF) receiver(s) 918. An RF receiver can receive, for example, AM/FM broadcasts or satellite broadcasts (e.g., XM® or Sirius® radio broadcast). An RF receiver can also be a TV tuner. In some implementations, RF receiver 918 is built into wireless communication subsystems 924. In other implementations, RF receiver 918 is an independent subsystem coupled to device 900 (e.g., using a wired connection or a wireless connection). RF receiver 918 can receive simulcasts. In some implementations, RF receiver 918 can include a Radio Data System (RDS) processor, which can process broadcast content and simulcast data (e.g., RDS data). In some implementations, RF receiver 918 can be digitally tuned to receive broadcasts at various frequencies. In addition, RF receiver 918 can include a scanning function which tunes up or down and pauses at a next frequency where broadcast content is available.

Camera subsystem 920 and optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 924. Communication subsystem(s) can include one or more wireless communication subsystems and one or more wired communication subsystems. Wireless communication subsystems can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving and/or transmitting data. The specific design and implementation of communication subsystem 924 can depend on the communication network(s) or medium(s) over which device 900 is intended to operate. For example, device 900 may include wireless communication subsystems designed to operate over a global system for mobile communications (GSM) network, a GPRS network, an enhanced data GSM environment (EDGE) network, 802.x communication networks (e.g., Wi-Fi, WiMax, or 3G networks), code division multiple access (CDMA) networks, and a Bluetooth™ network. Communication subsystems 924 may include hosting protocols such that Device 900 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 926 can be coupled to speaker 928 and one or more microphones 930. One or more microphones 930 can be used, for example, to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to touch screen 946. Touch screen 946 and touch screen controller 942 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 946 or proximity to touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of touch screen 946; and a pressing of the button for a second duration that is longer than the first duration may turn power to device 900 on or off. The user may be able to customize a functionality of one or more of the buttons. Touch screen 946 can, for example, also be used to implement virtual or soft buttons and/or a keyboard.

In some implementations, device 900 can present recorded audio and/or video files, such as MP3, AAC, and MPEG files. In some implementations, device 900 can include the functionality of an MP3 player, such as an iPhone™

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can be a kernel (e.g., UNIX kernel).

Memory 950 may also store communication instructions 954 to facilitate communicating with one or more additional devices, one or more computers and/or one or more servers.

Communication instructions 954 can also be used to select an operational mode or communication medium for use by the device, based on a geographic location (obtained by GPS/Navigation instructions 968) of the device. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions, e.g., mapping a target location; camera instructions 970 to facilitate camera-related processes and functions; and/or other software instructions 972 to facilitate other processes and functions, e.g., security processes and functions, device customization processes and functions (based on predetermined user preferences), and other software functions. Memory 950 may also store other software instructions (not shown), such as web video instructions to facilitate web video-related processes and functions; and/or web shopping instructions to facilitate web shopping-related processes and functions. In some implementations, media processing instructions 966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of device 900 may be implemented in hardware and/or in software, including in one or more signal processing and/or application specific integrated circuits.

Network Operating Environment for a Device

Figure 10:
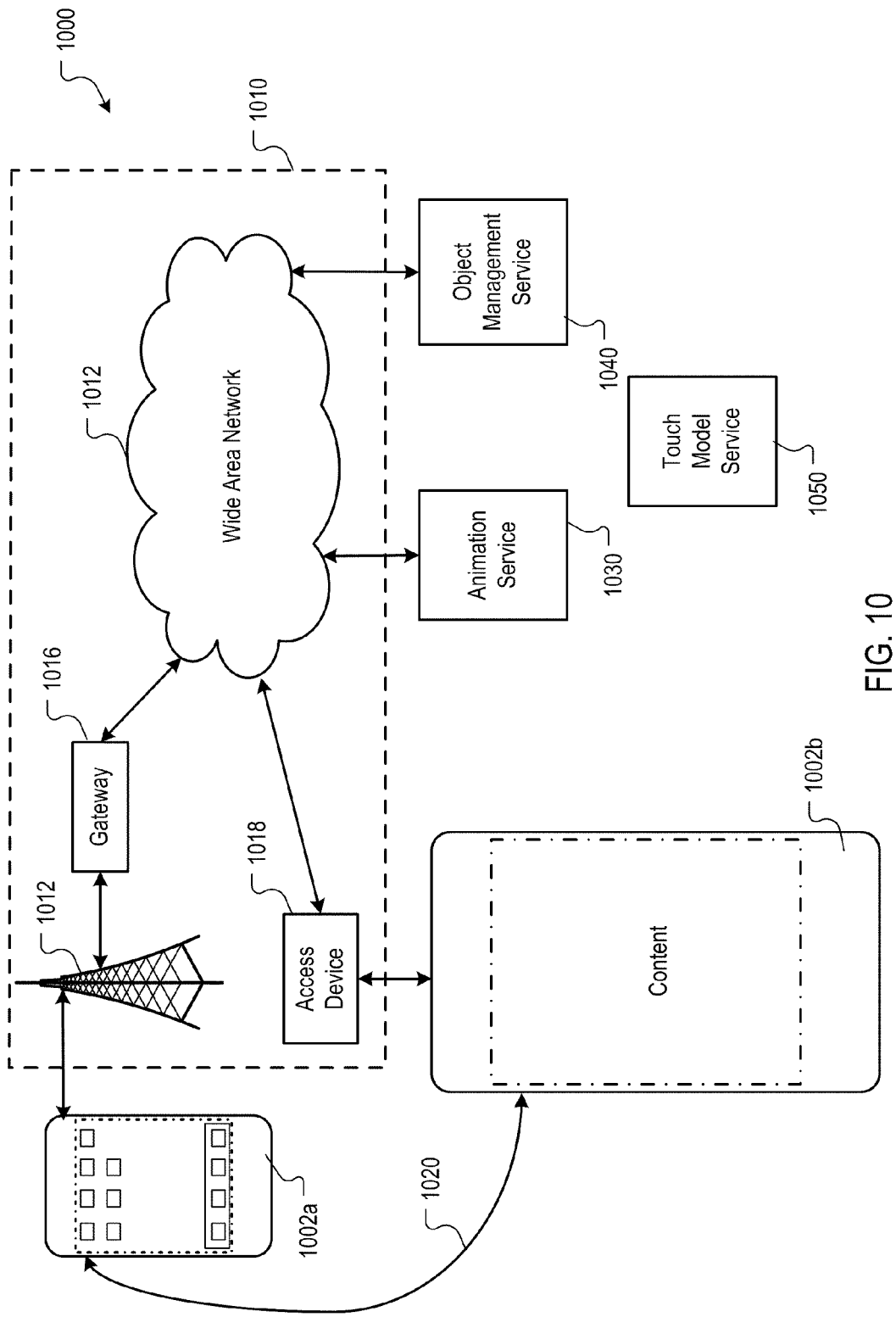
FIG. 10 is a block diagram of an example network operating environment for a device implementing the features described in reference to FIGS. 1-7.

FIG. 10 is a block diagram of example network operating environment 1000 for a device implementing the operations described above. Devices 1002a and 1002b can, for example, communicate over one or more wired and/or wireless networks 1010 in data communication. For example, wireless network 1012, e.g., a cellular network, can communicate with a wide area network (WAN) 1014, such as the Internet, by use of gateway 1016. Likewise, access device 1018, such as an 802.11g wireless access device, can provide communication access to wide area network 1014. In some implementations, both voice and data communications can be established over wireless network 1012 and access device 1018. For example, device 1002a can place and receive phone calls (e.g., using VoIP protocols), send and receive e-mail messages (e.g., using POP3 protocol), and retrieve electronic documents and/or streams, such as web pages, photographs, and videos, over wireless network 1012, gateway 1016, and wide area network 1014 (e.g., using TCP/IP or UDP protocols). Likewise, in some implementations, device 1002b can place and receive phone calls, send and receive e-mail messages, and retrieve electronic documents over access device 1018 and wide area network 1014. In some implementations, devices 1002a or 1002b can be physically connected to access device 1018 using one or more cables and access device 1018 can be a personal computer. In this configuration, device 1002a or 1002b can be referred to as a "tethered" device.

Devices 1002a and 1002b can also establish communications by other means. For example, wireless device 1002a can communicate with other wireless devices, e.g., other devices 1002a or 1002b, cell phones, etc., over wireless network 1012. Likewise, devices 1002a and 1002b can establish peer-to-peer communications 1020, e.g., a personal area network, by use of one or more communication subsystems, such as a Bluetooth™ communication device. Other communication protocols and topologies can also be implemented.

Devices 1002a or 1002b can, for example, communicate with one or more services over one or more wired and/or wireless networks 1010. These services can include, for example, animation service 1030, object management service 1040, and touch model service 1050. Animation service 1030 generates the animations described above when graphical objects are moved, deleted, and securely deleted. Object management service 1040 determines how to process display graphical objects and their corresponding system graphical objects, for example, as described above with reference to FIG. 12. Touch model service 1050 provides the touch model features described above with reference to FIG. 12.

Device 1002a or 1002b can also access other data and content over one or more wired and/or wireless networks 1010. For example, content publishers, such as news sites, RSS feeds, web sites, blogs, social networking sites, developer networks, etc., can be accessed by Device 1002a or 1002b. Such access can be provided by invocation of a web browsing function or application (e.g., a browser) in response to a user touching, for example, a Web object.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information fro transmission to suitable receiver apparatus for execution by a programmable processor.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method performed by one or more processors, comprising:
   presenting first graphical objects on a user interface shown on a display of a device;
   receiving, from a first input tool, a first touch input through the user interface, the first touch input tracing a perimeter around a subset of the first graphical objects following a movement of the first input tool touching the display;
   responsive to the first touch input, transforming an area of the user interface including the subset of the first graphical objects within the perimeter into a second graphical object, wherein the first graphical objects include two-dimensional file or folder icons and the second graphical object includes a three-dimensional sphere, and wherein transforming the area of the user interface into the second graphical object comprises transforming the area of the user interface enclosed by the perimeter into the sphere, wherein the file or folder icons are displayed on the sphere;
   receiving a second touch input in response to a second input tool touching the second graphical object; and
   responsive to the second touch input, animating the second graphical object in the user interface so that it appears to become smaller, and compressing or archiving data represented by the second graphical object.

2. The method of claim 1, where animating the second graphical object comprises:
   animating the second graphical object to appear to be detached from the user interface.

3. The method of claim 1, further comprising:
   receiving a motion input associated with the device; and
   animating the second graphical object so that it moves in a direction on the user interface based on the motion input.

4. The method of claim 3, further comprising:
   animating the second graphical object to move at a speed on the user interface according to a size of the second graphical object.

5. The method of claim 3, further comprising:
   detecting presence of a second device;
   establishing a communication link with the second device;
   responsive to the motion input, animating the second graphical object so that it appears to leave the user interface; and
   transmitting data represented by the second graphical object to the second device.

6. The method of claim 1, where the second touch input includes touching the second graphical object at two opposing points in the user interface and making a pinching gesture and a reduction in displayed dimension of the second graphical object is proportional to a pinching distance.

7. The method of claim 6, where the radius of the sphere is reduced in accordance with the pinching distance.

8. The method of claim 1, where animating the second graphical object comprises:
   animating the second graphical object according to a physical characteristic of the user interface that is set by a user, where the physical characteristic is one of coefficient of friction or viscosity, and where the second graphical object is animated to move at a slower speed in a user interface with a higher coefficient of friction compared to movement of the second graphical object in a user interface with a lower coefficient of friction.

9. The method of claim 1, where the first input tool includes a finger of a user, and wherein receiving the first touch input comprises:
   receiving the first touch input from the user touching the display using the finger and visually drawing a boundary around the area in the user interface including the subset of the first graphical objects; and
   transforming the area into the second graphical object.

10. The method of claim 1, where animating the second graphical object comprises:
    modifying color or shape of the second graphical object to indicate compression or archive of the data represented by the second graphical object.

11. The method of claim 1, where transforming the area of the user interface includes transforming the user interface from a two-dimensional user interface to a three-dimensional user interface.

12. The method of claim 1, where animating the second graphical object comprises displaying a textual indicator providing information on a reduced size of the second graphical object.

13. A system comprising:
    one or more processors; and
    a computer-readable medium coupled to the one or more processors and storing instructions, which, when executed by the one or more processors, cause the one or more processors to perform operations, comprising:
    presenting first graphical objects on a user interface shown on a display of a device;
    receiving, from a first input tool, a first touch input through the user interface, the first touch input tracing a perimeter around a subset of the first graphical objects following a movement of the first input tool touching the display;
    responsive to the first touch input, transforming an area of the user interface including the subset of the first graphical objects within the perimeter into a second graphical object, wherein the first graphical objects include two-dimensional file or folder icons and the second graphical object includes a three-dimensional sphere, and wherein transforming the area of the user interface into the second graphical object comprises transforming the area of the user interface enclosed by the perimeter into the sphere, wherein the file or folder icons are displayed on the sphere;
    receiving a second touch input in response to a second input tool touching the second graphical object; and
    responsive to the second touch input, animating the second graphical object in the user interface so that it appears to become smaller, and compressing or archiving data represented by the second graphical object.

14. The system of claim 13, where animating the second graphical object comprises:
    animating the second graphical object to appear to be detached from the user interface.

15. The system of claim 13, further comprising:
    receiving a motion input associated with the device; and
    animating the second graphical object so that it moves in a direction on the user interface based on the motion input.

16. The system of claim 15, further comprising:
    animating the second graphical object to move at a speed on the user interface according to a size of the second graphical object.

17. The system of claim 15, further comprising:
    detecting presence of a second system;
    establishing a communication link with the second system;
    responsive to the motion input, animating the second graphical object so that it appears to leave the user interface; and
    transmitting data represented by the second graphical object to the second system.

18. The system of claim 13, where the second touch input includes touching the second graphical object at two opposing points in the user interface and making a pinching gesture and a reduction in displayed dimension of the second graphical object is proportional to a pinching distance.

19. The system of claim 18, where the radius of the sphere is reduced in accordance with the pinching distance.

20. The system of claim 13, where animating the second graphical object comprises:
    animating the second graphical object according to a physical characteristic of the user interface that is set by a user, where the physical characteristic is one of coefficient of friction or viscosity, and where the second graphical object is animated to move at a slower speed in a user interface with a higher coefficient of friction compared to movement of the second graphical object in a user interface with a lower coefficient of friction.

21. The system of claim 13, where the first input tool includes a finger of a user, and wherein receiving the first touch input comprises:
    receiving the first touch input from the user touching the display using the finger and visually drawing a boundary around the area in the user interface including the subset of the first graphical objects; and
    transforming the area into the second graphical object.

22. The system of claim 13, where animating the second graphical object comprises:
    modifying color or shape of the second graphical object to indicate compression or archive of the data represented by the second graphical object.

23. The system of claim 13, where transforming the area of the user interface includes transforming the user interface from a two-dimensional user interface to a three-dimensional user interface.

24. The system of claim 13, where animating the second graphical object comprises displaying a textual indicator providing information on a reduced size of the second graphical object.

25. A non-transitory computer-readable medium storing instructions, which, when executed by one or more processors, are configured to cause the one or more processors to perform operations comprising:
    presenting first graphical objects on a user interface shown on a display of a device;
    receiving, from a first input tool, a first touch input through the user interface, the first touch input tracing a perimeter around a subset of the first graphical objects following a movement of the first input tool touching the display;
    responsive to the first touch input, transforming an area of the user interface including the subset of the first graphical objects within the perimeter into a second graphical object, wherein the first graphical objects include two-dimensional file or folder icons and the second graphical object includes a three-dimensional sphere, and wherein transforming the area of the user interface into the second graphical object comprises transforming the area of the user interface enclosed by the perimeter into the sphere, wherein the file or folder icons are displayed on the sphere;

receiving a second touch input in response to a second input tool touching the second graphical object; and responsive to the second touch input, animating the second graphical object in the user interface so that it appears to become smaller, and compressing or archiving data represented by the second graphical object.

26. The non-transitory computer-readable medium of claim 25, where the second touch input includes touching the second graphical object at two opposing points in the user interface and making a pinching gesture and a reduction in displayed dimension of the second graphical object is proportional to a pinching distance.

27. The non-transitory computer-readable medium of claim 26, where the radius of the sphere is reduced in accordance with the pinching distance.

28. The non-transitory computer-readable medium of claim 25, where animating the second graphical object comprises:

animating the second graphical object to appear to be detached from the user interface.

29. The non-transitory computer-readable medium of claim 25, further comprising:

receiving a motion input associated with the device; and animating the second graphical object so that it moves in a direction on the user interface based on the motion input.

30. The non-transitory computer-readable medium of claim 29, comprising:

animating the second graphical object to move at a speed on the user interface according to a size of the second graphical object.

31. The non-transitory computer-readable medium of claim 29, comprising:

detecting presence of a second system;

establishing a communication link with the second system;

responsive to the motion input, animating the second graphical object so that it appears to leave the user interface; and transmitting data represented by the second graphical object to the second system.

32. The non-transitory computer-readable medium of claim 25, where animating the second graphical object comprises:

animating the second graphical object according to a physical characteristic of the user interface that is set by a user, where the physical characteristic is one of coefficient of friction or viscosity, and where the second graphical object is animated to move at a slower speed in a user interface with a higher coefficient of friction compared to movement of the second graphical object in a user interface with a lower coefficient of friction.

33. The non-transitory computer-readable medium of claim 25, where the first input tool includes a finger of a user, and wherein receiving the first touch input comprises:

receiving the first touch input from the user touching the display using the finger and visually drawing a boundary around the area in the user interface including the subset of the first graphical objects; and transforming the area into the second graphical object.

34. The non-transitory computer-readable medium of claim 25, where animating the second graphical object comprises:

modifying color or shape of the second graphical object to indicate compression or archive of the data represented by the second graphical object.

35. The non-transitory computer-readable medium of claim 25, where transforming the area of the user interface includes transforming the user interface from a two-dimensional user interface to a three-dimensional user interface.

36. The non-transitory computer-readable medium of claim 25, where animating the second graphical object comprises displaying a textual indicator providing information on a reduced size of the second graphical object.

* * * * *